(No Model.) 2 Sheets—Sheet 2.

A. S. BAKER.

MECHANISM FOR TRANSMITTING POWER FROM WINDMILL SHAFTS.

No. 256,616. Patented Apr. 18, 1882.

Attest:
H. W. Seely
O. D. Mott

Inventor:
Allen S. Baker,
By Rich'd N. Dyer
Atty.

UNITED STATES PATENT OFFICE.

ALLEN S. BAKER, OF EVANSVILLE, WISCONSIN.

MECHANISM FOR TRANSMITTING POWER FROM WINDMILL-SHAFTS.

SPECIFICATION forming part of Letters Patent No. 256,616, dated April 18, 1882.

Application filed March 9, 1882. (No model.)

*To all whom it may concern:*

Be it known that I, ALLEN S. BAKER, of Evansville, in the county of Rock and State of Wisconsin, have invented a certain new and useful Improvement in Mechanisms for Transmitting Power from Windmill-Shafts, of which the following is a specification.

It is well understood that in geared power windmills for operating feed-grinders or other machinery requiring a rotary motion the gearing employed allows the driven machinery to react on the turn-table of the mill, tending to twist the same around and throw the wind-wheel out of the wind. Various means have been devised for obviating this reacting twisting tendency, among which may be mentioned swiveled reciprocating connections acting in only one direction and others acting in both directions and swiveled and compensating gearing.

The object I have in view is to produce still other means for obviating the reacting twisting tendency in power windmills, which means will be much more simple in construction and durable in use than those heretofore proposed, and will transmit a larger per cent. of the power to the driven machinery. This I accomplish by the use of an endless belt formed by chain or wire rope, or of other suitable material or construction. The endless belt, which is preferably a chain, passes over a suitable wheel on the inner end of the wind-wheel shaft, and over another wheel, which may be located at or near the bottom of the windmill-tower, from which latter wheel connection is made with the machinery to be driven. Since the shifting of the wind-wheel with the wind would twist the chain-belt, it is essential to provide means for taking the twist out of the belt or allowing it to be untwisted without reversing the motion of the driven machinery.

I prefer a hand-operated device for this purpose, on account of its simplicity and durability; but automatically operated or controlled mechanism can be employed to accomplish the same object.

Figure 1:
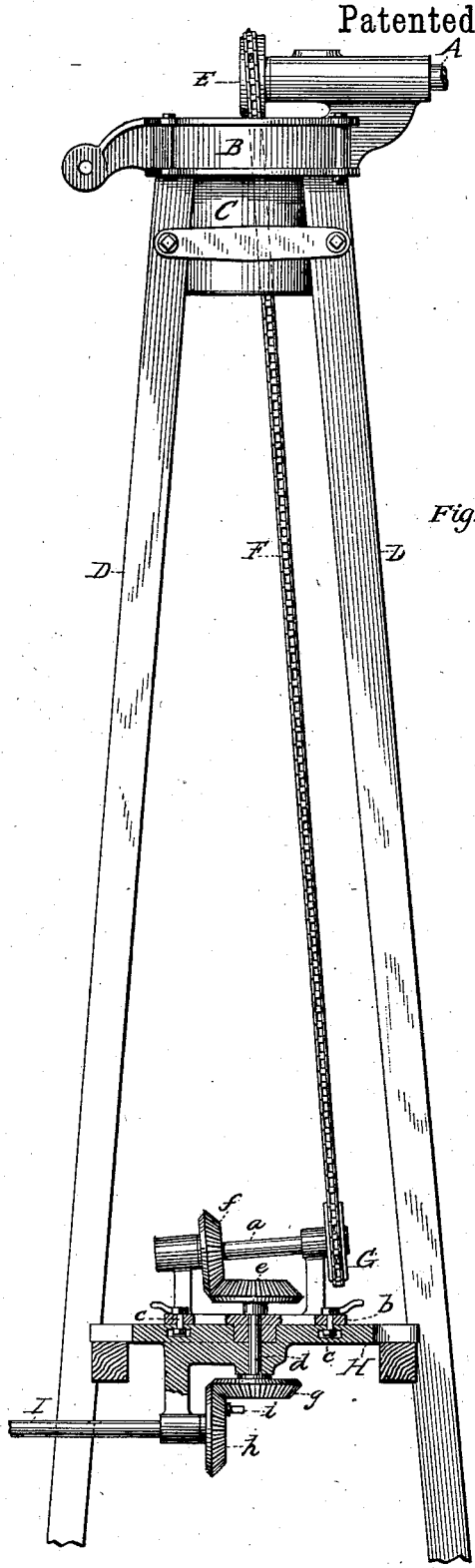
Figure 2:
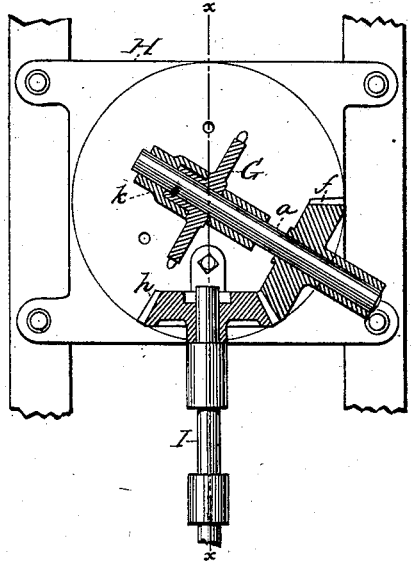
Figure 3:
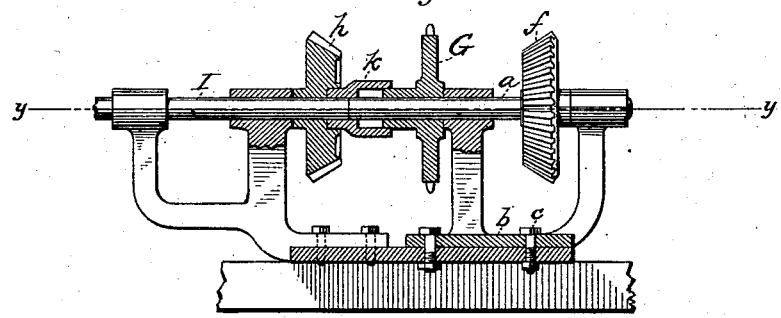
Figure 4:
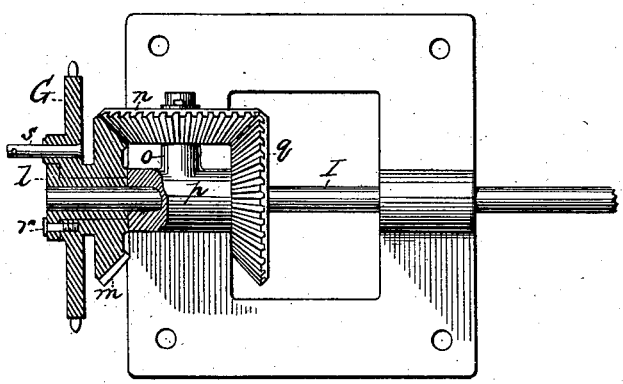

In the drawings, which illustrate the preferred ways of carrying out my invention, Figure 1 is an elevation of the tower of a windmill embodying my invention, the driven mechanism being in partial vertical section; Fig. 2, a top view and partial horizontal section of another form of device for taking the twist out of the belt; Fig. 3, a vertical section and elevation of the form of device shown in Fig. 2, the parts being adjusted to a different position; and Fig. 4, a top view and partial horizontal section of a device for permitting the belt to be untwisted without reversing the motion of the line-shaft.

Like letters denote corresponding parts in all four figures.

A is the wind-wheel shaft, B the turn-table, C the tower-casting, and D the tower, all of any usual or suitable construction. On the inner end of the wind-wheel shaft A is secured a wheel, E, which is preferably a sprocket or chain wheel.

F is an endless belt, which is preferably a chain. It passes over wheel E, hangs down through the tower, and passes around another wheel, G, which is a part of the mechanism located at or near the bottom of the tower. Wheel G is keyed to a shaft, $a$, which is supported in bearings from a turn-table, $b$. The turn-table $b$ is pivoted upon the bed-plate H, and is secured in any desired position thereto by bolts $c$, which enter a circular slot in the bed-plate. A vertical shaft, $d$, passes through H and $b$. At its upper end it carries a bevel-gear, $e$, meshing with a bevel-gear, $f$, keyed to shaft $a$. The lower end of shaft $d$ has a bevel-gear, $g$, meshing with a bevel-gear, $h$, on the line-shaft I. Gear $h$ has a wrist-pin, $i$, which can be used for a pump or other reciprocating connection. By these means the driven wheel G can always be adjusted exactly in line with the wheel E on the wind-wheel shaft, so as to take the twist out of the belt, the line-shaft I being always driven in the same direction.

Experience has shown that the wind changes a few degrees only in the course of twenty-four hours, usually not more than from forty-five to ninety degrees, and rarely over one hundred and eighty degrees. These changes I find do not materially affect the working of a chain or wire-rope endless belt, and consequently the adjustment made at starting will generally suffice for the entire day. Hence it will be seen that the mechanism requires but little attention, and being located at or near the bottom of the tower it can be readily cared for without the loss of time necessarily concured, so that the gear $f$ can be made to engage either side of the gear $h$, or by stopping at a central position the shaft $a$ can be coupled directly with line-shaft I by means of sleeve $k$. This direct coupling can be used a great part of the time. It will be seen that in all three positions the line-shaft will be driven in the same direction.

The devices so far specifically described provide for taking the twist out of the endless belt by turning the driven wheel, the chain not being removed therefrom.

Since the parts will operate satisfactorily when the belt has a twist of one hundred and eighty degrees, the twist may be taken out when that point is exceeded by removing it from a wheel having a fixed position and then replacing it thereon. The motion of the line-shaft would, however, be reversed, which is not desirable. To meet these conditions I provide the construction shown in Fig. 4, which is adapted for two positions of the belt. The driven wheel G is mounted loosely on a flanged bearing, $l$, keyed to the line-shaft I. This wheel G is made in one piece with or has secured to it a bevel-gear, $m$. Gear $m$ meshes with a bevel-gear, $n$, mounted upon a stud, $o$, from the bearing $p$ of the line-shaft. Gear $n$ also meshes with a gear, $q$, keyed to the line- used for taking up the slack of the belt when desired.

What I claim is—

1. In a windmill, the combination, with the wind-wheel shaft carried by a turn-table, of an endless-belt connection between the same and the driven mechanism, substantially as set forth.

2. In a windmill, the combination, with the tower, the turn-table, and the wind-wheel shaft, of a driven mechanism located at or near the bottom of the tower, and an endless-belt connection between the wind-wheel shaft and such driven mechanism, substantially as set forth.

3. In a windmill, an endless-belt connection with the wind-wheel shaft, in combination with means for untwisting or permitting the untwisting of the belt without reversing the driven mechanism, substantially as set forth.

4. In a windmill, the combination of the endless-belt connection with means operated by hand for untwisting or permitting the untwisting of the belt without reversing the driven mechanism, substantially as set forth.

This specification signed and witnessed this 17th day of February, 1882.

ALLEN S. BAKER.

Witnesses:
 CALEB SNEERHALL,
 J. H. HOSKINS.